US005126759A

United States Patent [19]

Small et al.

[11] Patent Number: 5,126,759

[45] Date of Patent: Jun. 30, 1992

[54] NON-IMPACT PRINTER WITH TOKEN BIT CONTROL OF DATA AND CURRENT REGULATION SIGNALS

[75] Inventors: Jeffrey A. Small, Chili; Mary A. Hadley; Martin Potucek, both of Greece; Hieu T. Pham, Webster, all of N.Y.

[73] Assignee: Eastman Kodak Company, Rochester, N.Y.

[21] Appl. No.: 543,930

[22] Filed: Jun. 26, 1990

[51] Int. Cl.[5] ........................ G01D 8/42; H04N 1/032

[52] U.S. Cl. ................................. 346/107 R; 358/302

[58] Field of Search ............. 346/107 R, 160; 377/75, 377/76, 114, 56; 370/85.1; 364/240.1, 159, 239.2, 923.5, 939.5; 365/219; 358/302

[56] References Cited

U.S. PATENT DOCUMENTS

| | | | |
|---|---|---|---|
| 3,850,517 | 11/1974 | Stephany et al. . | |
| 4,168,531 | 9/1979 | Eichelberger et al. | 346/900 |
| 4,598,358 | 7/1986 | Boddie et al. | 364/200 |
| 4,746,941 | 5/1988 | Pham et al. | 364/519 |
| 4,750,010 | 6/1988 | Ayers et al. | 346/107 R |
| 4,831,395 | 5/1989 | Pham et al. | 346/160 |
| 4,885,597 | 12/1989 | Tschang et al. | 364/519 |
| 5,025,322 | 6/1991 | Ng | 346/107 R X |

*Primary Examiner*—Benjamin R. Fuller
*Assistant Examiner*—David Yockey
*Attorney, Agent, or Firm*—Norman Rushefsky

[57] ABSTRACT

An LED printhead or the like includes a data bus for carrying multibit digital image data signals for grey level recording. A token bit signal is generated and shifted through registers upon the printhead to enable image data registers associated with each LED to latch the image data signals in appropriate order. The image data signals control the energization times for recording pixels. A digitally adjustable current mirror controls the level of current to each LED during recording. Digital current data signals for controlling this level of current are also communicated over one of the lines of the data bus. A token bit signal is also used to control the latching of current data signals in registers storing the digital data used for current control.

20 Claims, 10 Drawing Sheets

NON-IMPACT PRINTER WITH TOKEN BIT CONTROL OF DATA AND CURRENT REGULATION SIGNALS

CROSS REFERENCE TO RELATED APPLICATION

This application is related to the following applications filed on even date herewith:

1. U.S. application Ser. No. 07/543,892, filed in the names of Mary A. Hadley et al and entitled, "Non-Impact Printer Apparatus with Improved Current Mirror Driver"
2. U.S. application Ser. No. 07/543,931, filed in the names of Yee S. Ng et al and entitled, "Non-Impact Printer For Recording in Color"
3. U.S. application Ser. No. 07/543,891, filed in the names of Jeffrey A. Small and entitled, "L.E.D. Printer Apparatus with Improved Temperature Compensation"
4. U.S. application Ser. No. 07/543,929, filed in the names of Martin Potucek et al and entitled, "L.E.D. Array Printer with Extra Driver Channel" and
5. U.S. application Ser. No. 543,507, filed in the names of Mike Mattern et al and entitled, "L.E.D. Printhead with Improved Current Mirror Driver and Driver Chip Therefor".

BACKGROUND OF THE INVENTION

1. Field of the Invention

The present invention relates to non-impact printer apparatus for recording, and more specifically, to circuitry thereon for controlling data and other signals flowing to a printhead forming part of the printer apparatus.

2. Description of the Prior Art

In U.S. Pat. No. 4,746,941, a grey level LED (light emitting diode) printhead is described. In a printhead of the type described therein, signals comprising plural digital data bits representing a time for recording a pixel (picture element) are simultaneously fed to the printhead over a data bus. A token bit is also provided simultaneously with the data to activate certain latch registers associated with a respective LED so that the data is distributed appropriately. As noted in this patent, the use of the token bit simplifies circuitry and connection pads on the printhead and thereby facilitates construction of the printhead.

In U.S. Pat. No. 4,885,597, an LED printhead is described wherein compensation for age and temperature of the LED's is accommodated to ensure that the intensity from the LED's is consistent over time. In this printhead, current to the LED's is regulated using digitally addressable current mirrors associated with each driver chip. The multi-bit digital signals used must be communicated to the driver chips.

In a highly productive printer apparatus there is insufficient time available to feed signals in serial fashion. While this simplifies printhead structure, productivity suffers. The requirement of additional signals for current regulation adds complexity to the structure and requires still more lines and connection pads.

It is therefore an object of the invention to provide an improved printhead with efficient means for handling data and other signals for controlling current to the recording elements.

SUMMARY OF THE INVENTION

The above object and others which will become apparent in reading the specification below are realized by a non-impact printer apparatus that includes a recording head having a plurality of recording elements for recording on a recording medium; driving means for selectively driving said plurality of recording elements in accordance with respective image data signals; image data bus means for carrying image data signals related to an exposure duration; said driving means including respective data register means associated with each recording element for storing said image data signals; means connecting said data bus means to said data register means; said driving means further including current regulating means for regulating the level of electrical current to each recording element, the current regulating means including means for adjusting the level of current in response to a multibit digital signal; and wherein the multibit digital signal used for regulating current is carried on the image data bus means.

The invention and its objects are further realized in a non-impact printer apparatus that includes a recording head having a plurality of recording elements for recording on a recording medium; driving means for selectively driving said plurality of recording elements in accordance with respective image data signals; said driving means including respective data register means associated with each recording element for storing said image data signals; data bus means for carrying image data signals; means commonly connecting said data bus means to said data register means; means for generating a token bit signal; a multistage shift register means for outputting sequentially at respective stages the token bit signal for sequentially selecting a respective data register means for accepting image data signals; said driving means further including current regulating means for regulating the level of electrical current to each recording element, the current regulating means including means for adjusting the level of current in response to a multibit digital signal; wherein the current regulating means includes first register means including a plurality of registers for storing digital signals related to a level of current control; second register means for storing and shifting a token bit signal; and means responsive to the token bit signal for latching in an appropriate register of said first register means the multibit digital signal.

The above and other objects and features of the present invention will become apparent from the following description taken in conjunction with the accompanying drawings.

BRIEF DESCRIPTION OF THE DRAWINGS

The subsequent description of a preferred embodiment of the present invention refers to the attached drawings wherein:

FIGS. 4, 4*a* and 4*b* are a block diagram of a driver chip made according to the invention;

FIGS. 5, 5*a* and 5*b* are a circuit diagram of one circuit incorporated on the driver chip in accordance with the invention.

DESCRIPTION OF THE PREFERRED EMBODIMENT

Because the apparatus of the type described herein are well known, the present description will be directed in particular to elements forming part of, or cooperating more directly with, the present invention.

Figure 1:
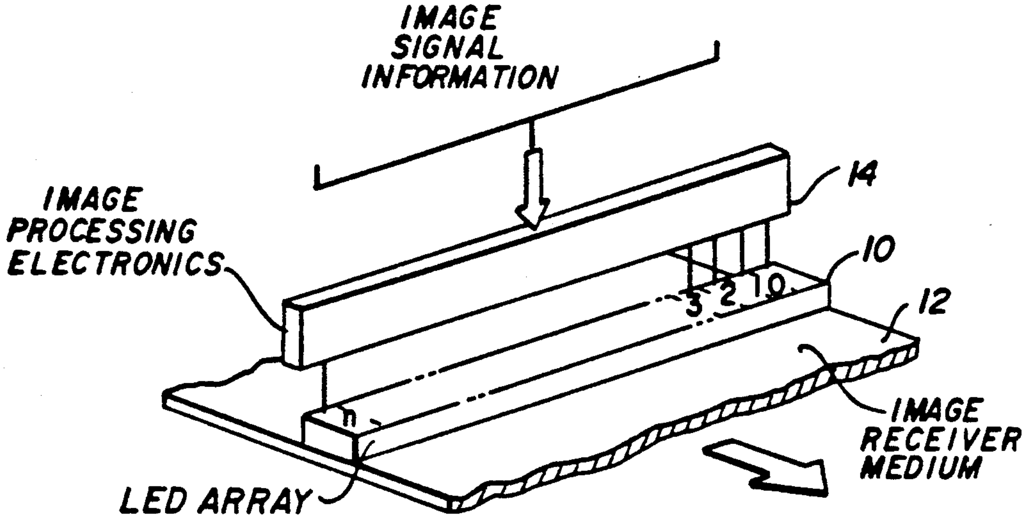
FIG. 1 (PRIOR ART)
FIG. 1 is a perspective view illustrating the general arrangement of a prior art non-impact printer.

The apparatus for the herein disclosed invention is typified by the diagram of FIG. 1; a linear array 10 of say 3584 triggerable recording elements; e.g. LED's, is disposed to expose selectively a photosensitive image-receiver medium 12 that is movable relative to the array by suitable conventional means (not shown). Optical means for focusing the LED's onto the medium may also be provided. In this regard, gradient index optical fiber devices such as Selfoc (trademark of Nippon Sheet Glass Co., Ltd.) arrays are highly suited. The LED's of the array are triggered into operation by means of image processing electronics 14 that are responsive to image signal information. Depending on the duration for which any given LED is turned on, the exposure effected by such LED is more or less made. Where the medium 12 is, say, photographic film the latent image formed line by line by selective exposure of said LED's may be subsequently developed by conventional means to form a visible image. Where the medium 12 is an electrophotographic receptor, the LED's may be used to form an electrostatic image on a uniformly electrostatically charged photoconductor and this image developed using opaque toner particles and perhaps transferred to a copy sheet, see U.S. Pat. Nos. 3,850,517 and 4,831,395, the contents of which are incorporated herein by this reference.

Figure 2:
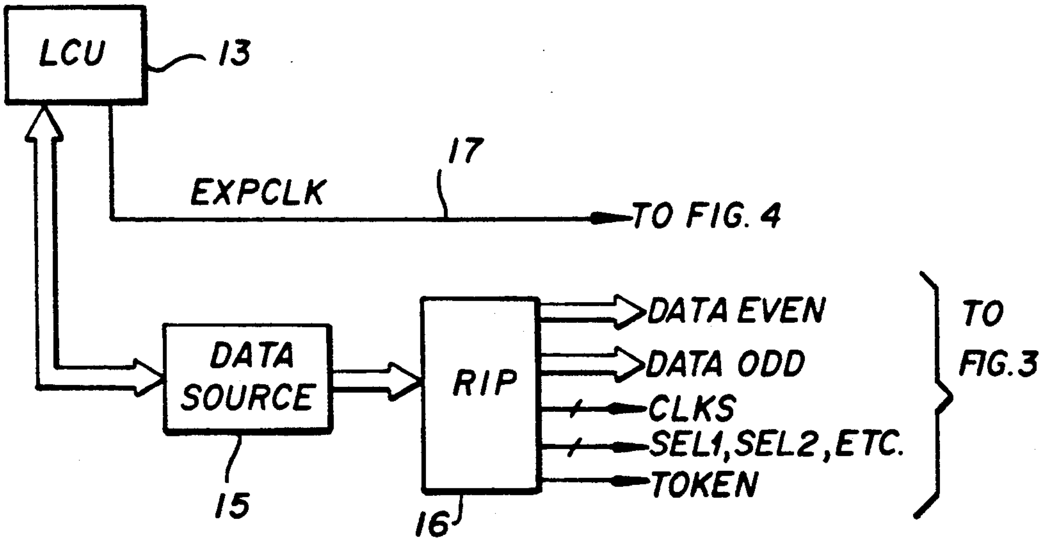
FIG. 2 is a block diagram of a circuit for providing signals to a non-impact head made in accordance with the invention.
Figure 3:
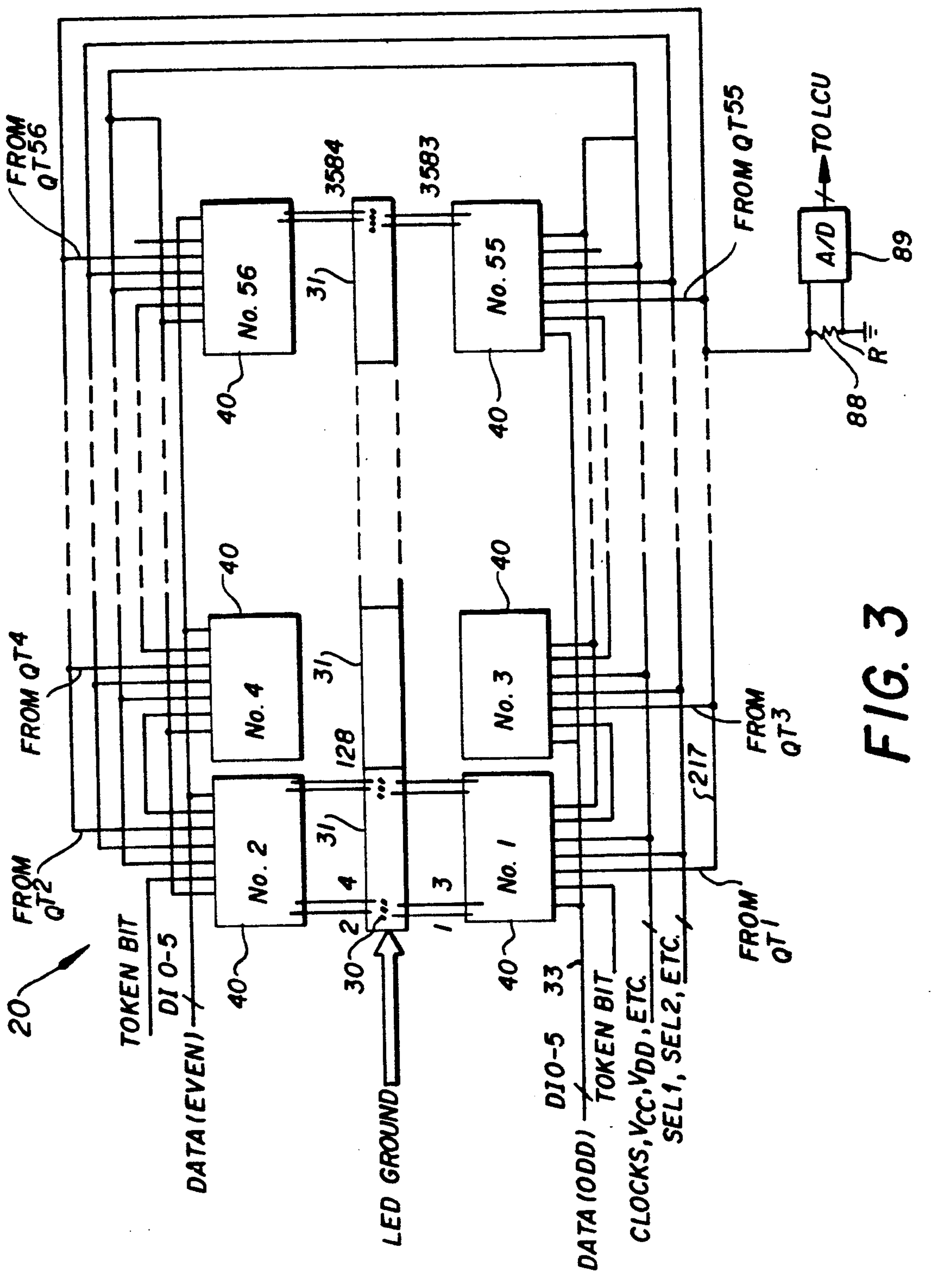
FIG. 3 is a block diagram of a printhead according to the invention, the printhead including a plurality of driver chips for driving the LED's formed on chip arrays.
Figure 4A:
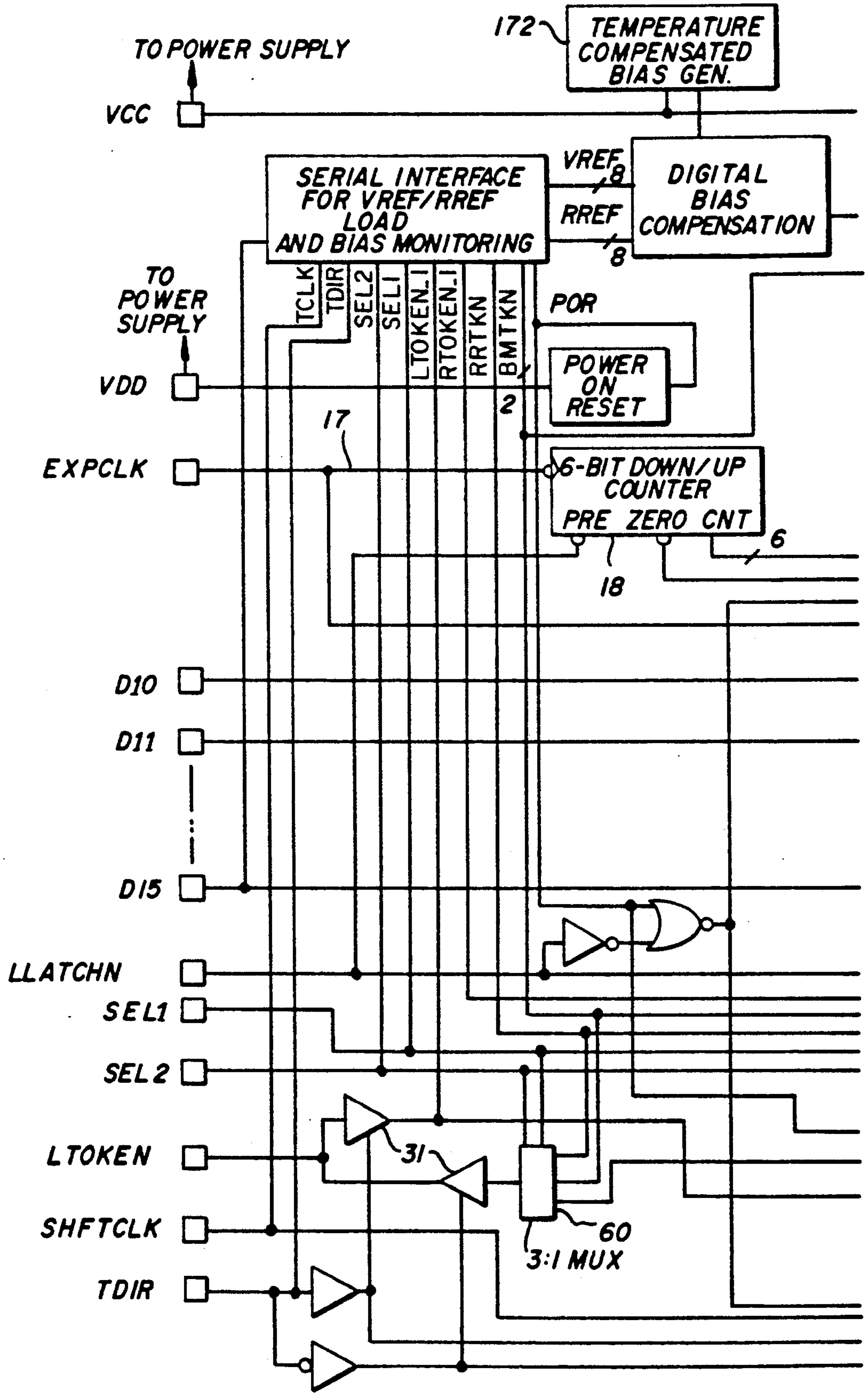
Figure 4B:
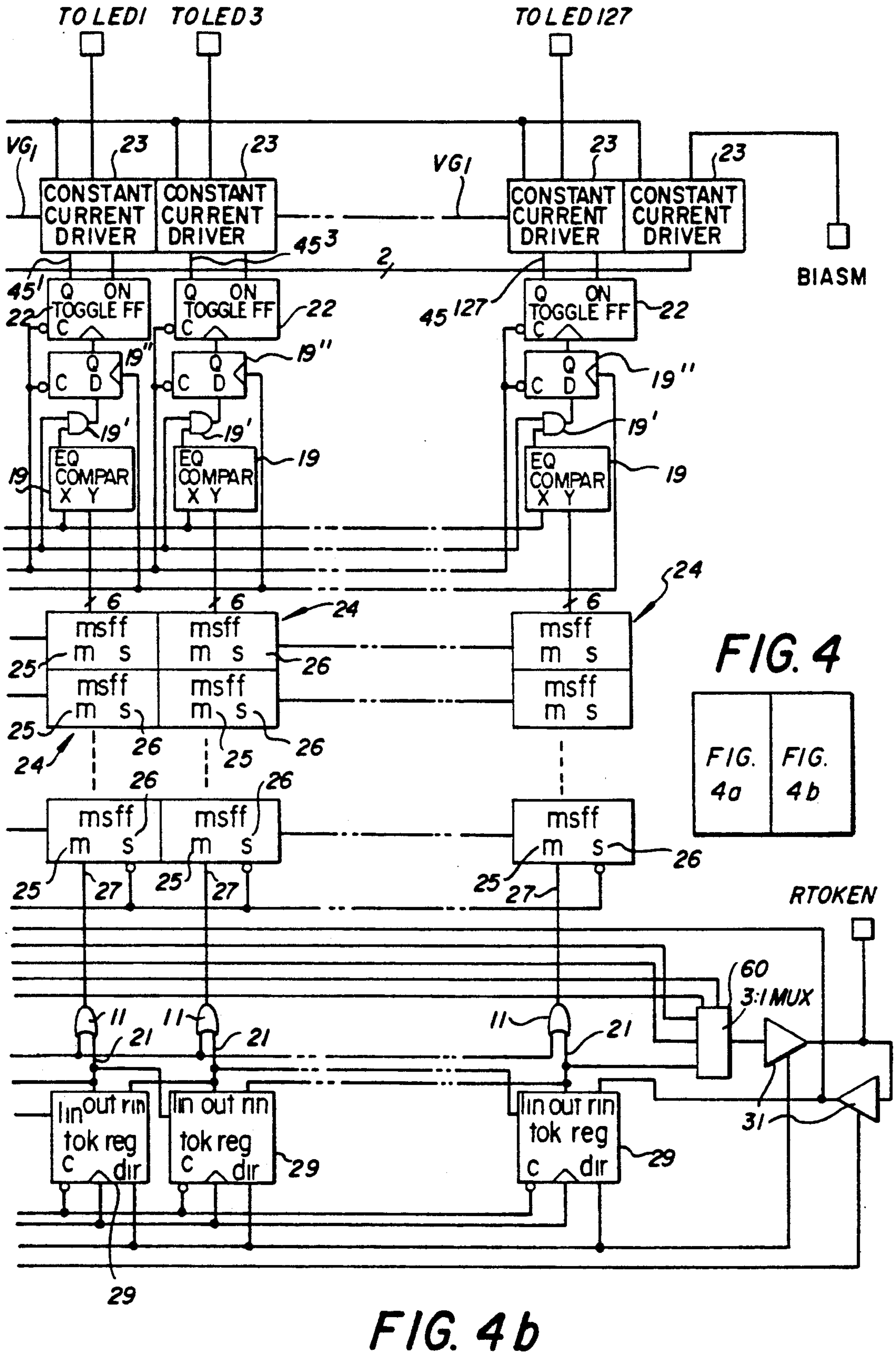

With reference now to FIGS. 2, 3, and 4, a data source 15 such as a computer, word processor, image scanner or other source of digitized image data, provides image data signals to a data processor 16 which may comprise a raster image processor. The data processor under control of clock pulses from a logic and control device (LCU) 13 provides a plurality of outputs including rasterized data outputs and control signals which are fed to the print head. In addition, the LCU provides clock pulses via line 17 to an down/up counter 18 (FIG. 4) which, when enabled by a signal from the LCU, counts such clock pulses and provides at an output having a plurality of lines a digital signal representation of the state of the counter. Typically, such a counter has one line representing a least significant bit of such count and other lines representing other more significant bits. In accordance with a technique fully described in U.S. Pat. No. 4,750,010 in the names of Ayers et al, the contents of which are incorporated herein by this reference, the output of counter 18 is provided to a first set of input terminals to a comparator 19 (see FIG. 4) associated with each recording element 30, i.e., LED in this embodiment. A plurality of data lines from each of a plurality of corresponding data registers 24 is provided to a second set of input terminals associated with each comparator 19. The comparators 19 all compare the output of the counter 18 with the value of the respective data. As will be described herein, the image data signals provided to each comparator relates to a desired ON time or period of enablement for a respective LED 30 for the recording of a particular pixel. As is well known, the LED's are alternately divided into odd and even-numbered LED's so that respective integrated circuit driver chips 40 therefor are located on opposite sides of the line of LED's. As the circuitry is identical for the corresponding driver chips, the discussion herein will be made as to one of these driver chips. The image data signals provided to each comparator 19 during the printing of a single line of dots by the row of LED's is related to the desired pixel or dot size to be exposed onto the image receiver medium by that LED for that particular line of dots. As shown in FIGS. 3 and 4, six independent lines of data DI0 through DI5 provide a six bit digital image data signal that allows for grey-scale variation of the output of each LED during each cycle of operation. During each cycle the data to each comparator may comprise six binary bits representing an amount from decimal 0 to decimal 63. Although the data lines DI0 through DI5 are shown passing through the data registers 24 in FIG. 4, it will be appreciated that this is for the convenience of this illustration and that actually such lines comprise a bus or plurality of data lines that are simultaneously available to all data registers as will be described below.

Suppose, for example, that an LED, $LED_1$, is to be enabled for a time period equal to 20 clock periods plus $T_{MIN}$. $T_{MIN}$ represents a pre-established minimum LED on time. In response to a start pulse on line LLATCHN, the counter 18 is enabled and commences to count exposure clock pulses from line 17 from decimal 63 to 0. Note that the clock pulses may be generated to have a variable programmable period. The six bit output of counter 18 is coupled to one set of inputs at terminal X of each of the comparators. This counter is now compared with the data input at another set of inputs at terminal Y of this comparator which represents in binary form decimal ten. When there is a "match," i.e., when the count of terminal X is 10, a pulse is provided at the output terminal of comparator 19 to cause latch or toggle flip-flop 22 to enable the constant current driver 23 to commence and maintain current to $LED_1$. After the counter counts down to zero, the counter may be inhibited from counting additional clock pulses for a period $T_{MIN}$ that is either programmed into the counter or provided by other suitable means. After this predetermined time period $T_{MIN}$, if used, the counter is set to count in its up mode and commences counting clock pulses again. When the counter, in its count up mode, reaches decimal 10 the flip-flop 22 is reset and current to the LED ceases. The other LED's, etc. operate in similar fashion but their data may require different count values to turn on and off. What these LED's will thus have in common is that all will have their respective current pulses centered, i.e., the midpoints of the respective current pulses will occur at the same time. The pulse duration for each LED during each line of print is varied, however, in accordance with their respective image data signals. Reference is also made to U.S. application Ser. No. 07/290,002, regarding a clocking scheme using a nonlinear clock, the contents of which are incorporated by this reference. As noted in this latter reference, correction for unequal light output from LED to LED may be provided by adjustment of the data in accordance with the characteristics of each LED. Thus, a programmable read only memory device or PROM or other programmable device may store the characteristics of each LED and data for that LED can be modified to provide an input count at terminal Y that represents data modified by the exposure characteristics of the LED. For example, for an LED that is a relatively strong light emitter the PROM would modify data bits for that LED to reduce the count that otherwise would be provided at terminal Y based solely on the data.

Still other circuitry for balancing the driving current to the LED's is described below and claimed in the cross-referenced application #1 noted above.

The description of the circuitry forming a part of the driving circuitry for distributing the image data signals to the appropriate comparator and to current driving circuits to which the present invention is particularly directed will now be described. It being understood, of course, that the invention in its broader aspects contemplates circuits that do not employ a comparator to control enablement of "ON" time. In the example of the circuitry for the print head shown in FIG. 3, the driving circuitry for the LED's are provided on opposite sides of the line of LED's 20. This is a known desirable arrangement for permitting LED's to be packed closer together to provide greater image resolution capabilities for the printer. As may be noted the circuit arrangement is an alternating one such that what may be called the even-numbered LED's have their respective driving circuitry located to one side of the line of LED's and what may be called the odd-numbered LED's have their respective driving circuitry located to the other side of the line of LED's. Typically, groups of, say, 64 of the odd numbered LED's will have their respective driving circuitry formed in a single integrated circuit chip and thus, for a print head having 3584 LED's on the print head, there may be 28 driving chips located on each side of the line of LED's. In order to save on production costs for these driving chips, it is desirable that they be identical. For the driving chips to be identical, although locatable on either side of the line of LED's, it is desirable for design simplicity that signals traversing the length of the print head be programmably movable in either direction.

The image data signals are output by the data processor 16 in accordance with image data signals for the odd-numbered LED's and image data signals for the even-numbered LED's. Discussion will now be made with regard to the image data signals for the even-numbered LED's, since operation and circuitry for the odd-numbered LED's is identical. Data lines DI0–DI5 are independent lines each carrying a signal representing a digital bit (0 or 1) so that together their respective signals define a digital six bit number from decimal 0 to decimal 63. This image data signal is passed along lines DI0–DI5 on the printhead which comprise an image data signal bus. Associated with each LED is a data register means 24 for latching data from this bus during each cycle of operation for printing a single line of dots or pixels. As will be discribed, a token bit is used to enable a data register means associated with a particular LED to accept the data while other data register means associated with other LED's await their respective data.

The data register means 24 for each LED comprises a pair of latches 25, 26 or bi-stable multivibrators (msff=master-slave flip flop) for each of the six data lines. The pair of latches are connected in a master-slave relationship wherein in response to a token bit signal at the enable input terminal of the master latch 25, an image data signal at the data input terminal of the master latch 25 will cause the output of the master latch to either change or remain the same depending upon the image data signal. It will be noted that the six master latches 25 in the data register means of each LED are commonly connected to a line 27 to simultaneously receive the token bit signal from the token bit shift register 28.

The token bit shift register 28 comprises a series of flip-flops 29 which have clock pulses (SHFTCLK) applied to the clock terminals thereof and the signal representing the token bit input to the data input terminal of each. Note that the same token bit signal will be provided to both the even and odd token bit shift registers for the even and odd numbered LED's. The output of each of these flip-flops 29 is connected to the data input terminal of the next flip-flop 29 in the series. Buffers 31 with enable inputs and direction controls are coupled to the token bit shift register 28 so that programmable control may be made of the direction for shifting the token bit along the token bit shift register 28. In the example where the token bit is to be shifted from left to right in FIG. 4 for the Data Odd half of the print head, the signal line TDIR (token direction) is made at an appropriate logic level to allow the token bit on line LTOKEN to pass from left to right. Thus, in response to clock pulses from the data processor 16 the token bit is passed from stage to stage (left to right in FIG. 4) of the token bit shift register 28 and accordingly outputted sequentially over respective lines 21 through OR gates 11 to lines 27 for enablement of all the master latches 25 of a respective data register 24. With movement of the token bit from stage to stage of the shift register 28 the data bits occurring on lines DI0–DI5 are accepted by the data registers 24 in turn from left to right until all the 1792 data registers on this side of the print head have acquired their respective six bits of data. A latch enable signal is then pulsed high on line LLATCHN to cause the respective slave latches 26 to latch the data at their respective outputs and to reset the toggle flip-flops 22. The respective outputs of the slave latches 26 are now communicated to the data input terminals Y of the respective comparators 19 for determining the duration of exposure for each LED in accordance with the techniques described above. The comparators 19 each have at an output an AND gate 19' and a D type flip-flop 19" in order to prevent the propagation of extraneous logic glitches from the comparator outputs to the toggle flip-flop inputs. The master latches 25 are now free to receive the image data signals for the next line of dots to be recorded.

After LLATCHN returns to its inactive level, on the first rising edge of EXPCLK while a particular comparator 19 output is at a logic high level, the respective toggle flip-flop 22 toggles from the reset state to the set state. The Q and QN outputs of this toggle flip-flop then cause the associated controlled current driver 23 to be enabled. After this same comparator's output has been returned to a low logic level, and then returns to a high logic level on some later rising edge of EXPCLK, the respective toggle flip-flop 22 toggles back to the reset state. The Q and QN outputs of this toggle flip-flop then disable the associated constant-current driver 23.

Figure 6A:
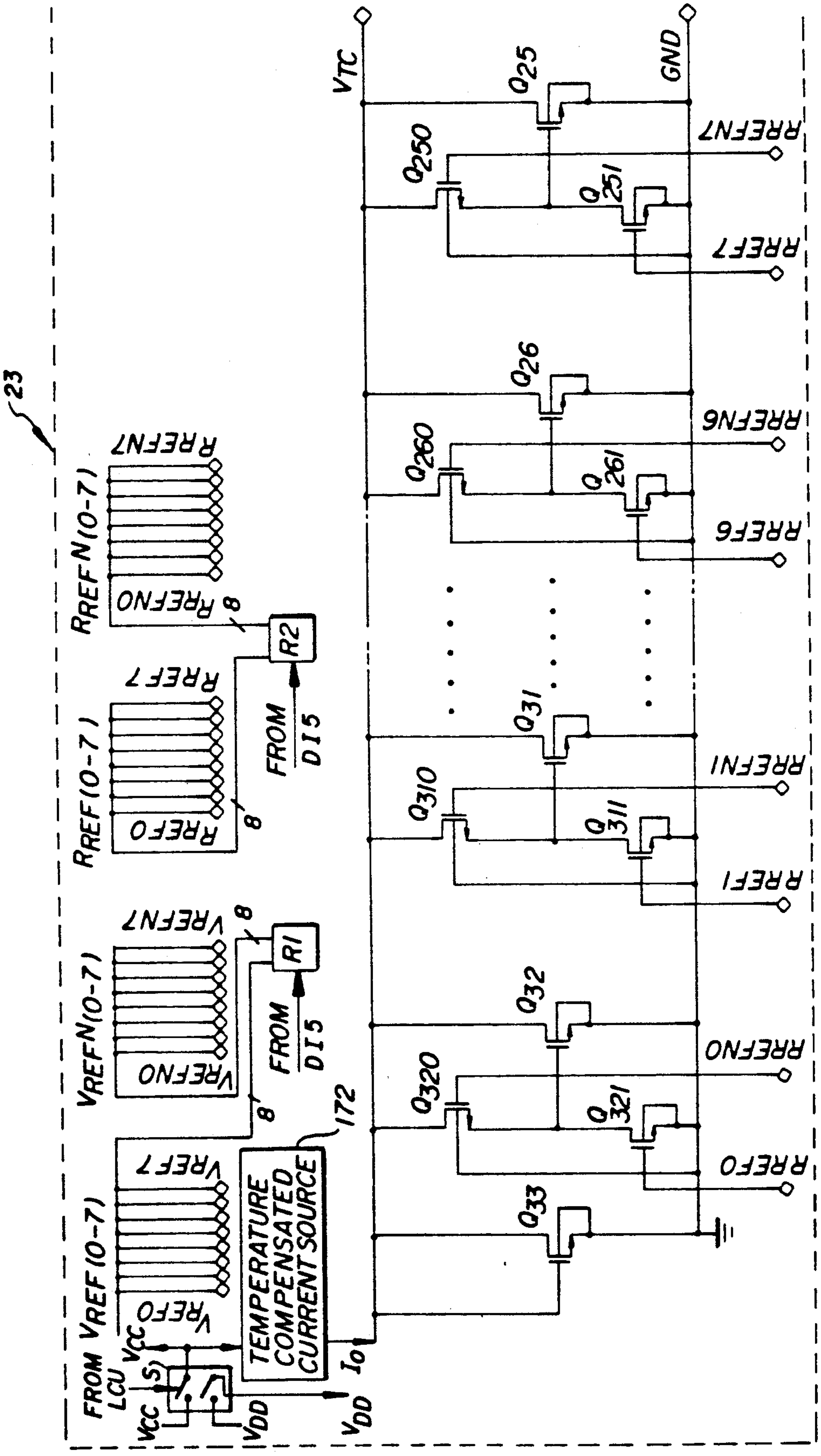
FIGS. 6A, B, C and D are a schematic of a current driving circuit incorporated on the driver chip of FIG. 4.

With reference now to FIGS. 6A, B, C and D, the current driving circuit 23 portion of each driver chip 40 is shown. The respective outputs of the toggle flip-flops 22 are fed over respective lines $45^1$, $45^3$, and the following lines not shown $45^5$, --- $45^{125}$ and $45^{127}$. As may be seen each of these lines is actually a double line one of which carries an enable signal to turn the respective LED on the other carries a complement of this signal. The lines 45[1] are input to respective control electrodes of transistors $Q_{426}$, $Q_{427}$. These transistors act as swithces and form a part of a current mirror driving circuit that includes a master circuit formed by transistors $Q_{424}$, $Q_{425}$ and a series of digitally controlled transistors. More details concerning the digitally controlled transistors will be found below with reference to the discussion of FIGS. 6A and 6B. Briefly, these digitally controlled transistors may be selectively turned on to establish a signal I (CHIP BIAS) to thereby regulate a desired current level for the LED's driven by this driver chip. As may be noted in FIG. 6C, circuitry for driving two LED's, i.e., $LED_1$ and $LED_3$ are illustrated; it being understood that the driver chip would have appropriate circuits typified by those described below for driving say 64 of the odd-numbered LED's in an LED chip array having, for example, 128 LED's. Another driver chip on the other side of the LED chip array would be used to drive the 64 even-numbered LED's.

The current through the master circuit establishes a potential $V_{G1}$ on line 117. Directly in series with $LED_1$ are two transistors $Q_{428}$, $Q_{429}$. Transistor $Q_{428}$ is biased to be always conductive while transistor $Q_{429}$ is switched on and off and thus is the transistor controlling whether or not current is driven to $LED_1$. The gate or control electrode of transistor $Q_{429}$ is coupled to the drain-source connection of transistors $Q_{426}$, $Q_{427}$. When $LED_1$ is to be turned on, transistor $Q_{427}$ is made conductive and when $LED_1$ is to be turned off, transistor $Q_{426}$ is made conductive. The gate of transistor $Q_{426}$ receives a logic signal that is the inverse of that to gate $Q_{427}$ from a data driven enabling means 22 that is the circuitry of FIG. 4 which controls whether or not an LED is to be turned on and for how long. As noted above in a grey level printhead, the LED is to be turned on for a duration determined by the grey level data signals input to the printhead.

Also associated with the circuitry for driving $LED_1$, is an additional current mirror that includes two slave circuits. One slave circuit comprises transistors $Q_{420}$, $Q_{421}$ and $Q_{430}$. The other slave circuit comprises transistors $Q_{422}$, $Q_{423}$ and $Q_{431}$. Transistors $Q_{430}$, $Q_{431}$ are N-channel MOSFETS while the other transistors noted above are P-channel MOSFETS. The two additional slave circuits associated with $LED_1$ are on continuously and assuming a nominal driving current of say $I_{LED1}=4$ ma to $LED_1$, the current through transistor $Q_{421}$ might be 1/80 $I_{LED1}$ and the current through transistor $Q_{423}$ might be $1/800 \times I_{LED1}$. The currents through these slave circuits establishes a voltage level $V_{G2}$ on line 114, which is the potential of the drain electrode of transistor $Q_{427}$.

In operation with transistor $Q_{429}$ turned off, transistor $Q_{426}$ is on and impresses approximately the voltage $V_{cc}$ at the gate of transistor $Q_{429}$. When $LED_1$ is to be turned on to record a pixel (picture element), a signal is provided by the data enabling means 22 (see FIG. 4) to the gate of transistor $Q_{427}$ to turn same on, while on inverse signal turns transistor $Q_{426}$ off. Before transistor $Q_{429}$ turns on, the capacitive load or charge existing between its gate and substrate must be removed. When transistor $Q_{427}$ turns on, the charge on the gate terminal of transistor $Q_{429}$ discharges through transistors $Q_{427}$ and $Q_{430}$. This path for discharge of the gate capacitive load at transistor $Q_{429}$ thereby provides a turn-on time not affected by the number of LED's that are sought to be simultaneously energized. The reason for this is that each control transistor corresponding to transistor $Q_{429}$ has its own respective path for discharge of its respective capacitive load. While the illustrated embodiment shows use of the additional current mirror circuit containing transistor $Q_{430}$ for use in discharging the control electrode of the driving transistor, it will be understood that in some circuit arrangements, charging, rather than discharging, of the control electrode may be facilitated.

Current through transistors $Q_{422}$, $Q_{423}$ and $Q_{431}$ is proportional to, i.e. mirrors, that through the master circuit because of the identical gate to source terminal biasing ($V_{GS1}$) of transistors $Q_{424}$ and $Q_{422}$. Thus, current is constant in this slave circuit even though $V_{cc}$ from power supply $P_2$ varies since the potential difference $V_{GS1}$ between the gate and source terminal of transistor $Q_{422}$ remains constant. The current through the slave circuit comprised of transistors $Q_{422}$, $Q_{423}$ and $Q_{431}$ is mirrored by that through the slave circuit comprised of transistors $Q_{420}$, $Q_{421}$ and $Q_{430}$ due to the identical gate to source biasing of transistors $Q_{430}$, $Q_{431}$. With a constant current being generated in the slave circuit comprised of transistors $Q_{420}$, $Q_{421}$ and $Q_{430}$, the potential difference between the gate and source terminals of transistor $Q_{420}$ remains fixed as does that of transistor $Q_{421}$ thereby establishing a voltage level $V_{G2}$ on line 114 which varies with $V_{cc}$ although the potential difference $V_{cc}-V_{G2}$ remains constant.

With the transistor $Q_{429}$ turned on and conducting driving current to $LED_1$ during an exposure period, the voltage level $V_{G2}$ is established at the gate of transistor $Q_{429}$ via now conducting transistor $Q_{427}$. The voltage level at the source terminal of transistor $Q_{429}$ is now at a fixed threshold value above that of $V_{G2}$. Transistor $Q_{429}$, acting as a cascode transistor and having its source terminal connected to the drain terminal of transistor $Q_{428}$, thereby establishes the drain potential of the transistor $Q_{428}$ as varying with changes in $V_{cc}$. As noted above, the potential difference $V_{GS1}$ is constant even though $V_{cc}$ itself varies. The voltage relationships between the various terminals of transistor $Q_{428}$ are not affected by variations in $V_{cc}$ and the current to $LED_1$ during a period for recording a pixel stays constant.

Thus, stability in driver current to $LED_1$ is provided since transient changes in $V_{cc}$ do not cause corresponding changes to the current conducted through $LED_1$ and thus do not affect the intensity level of light output by $LED_1$. The tendency in some LED printheads for light output of an LED to diminish when other LED's are turned on can also be reduced with this circuit. As noted above, transistor $Q_{429}$ conducts current to $LED_1$ for a time period controlled by the data bits for recording an appropriate pixel. The level of current for recording this pixel is controlled by the current mirror which is responsive to the current level I(CHIP BIAS). The circuit for generating I(CHIP BIAS) will now be described.

Figure 6B:
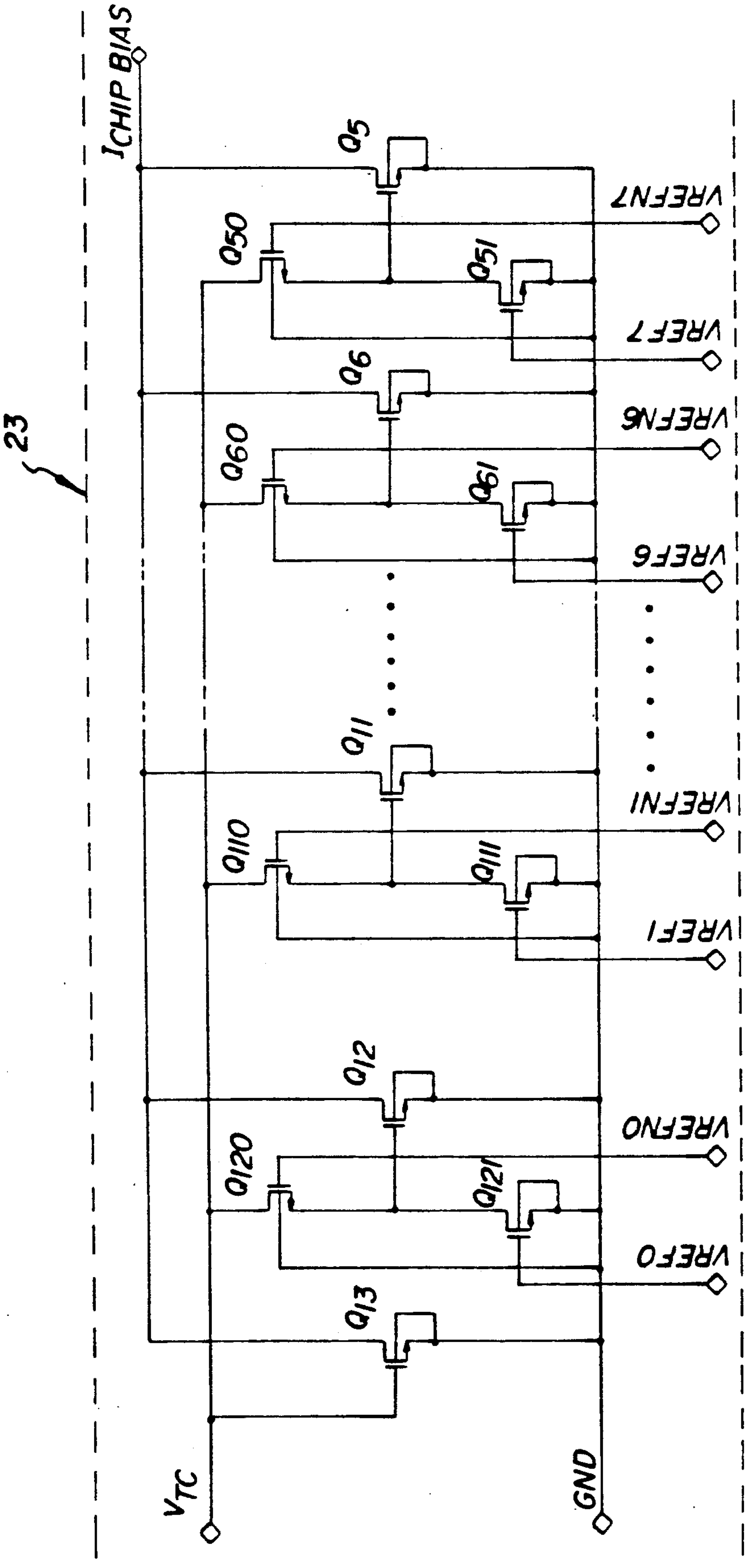
Figure 6C:
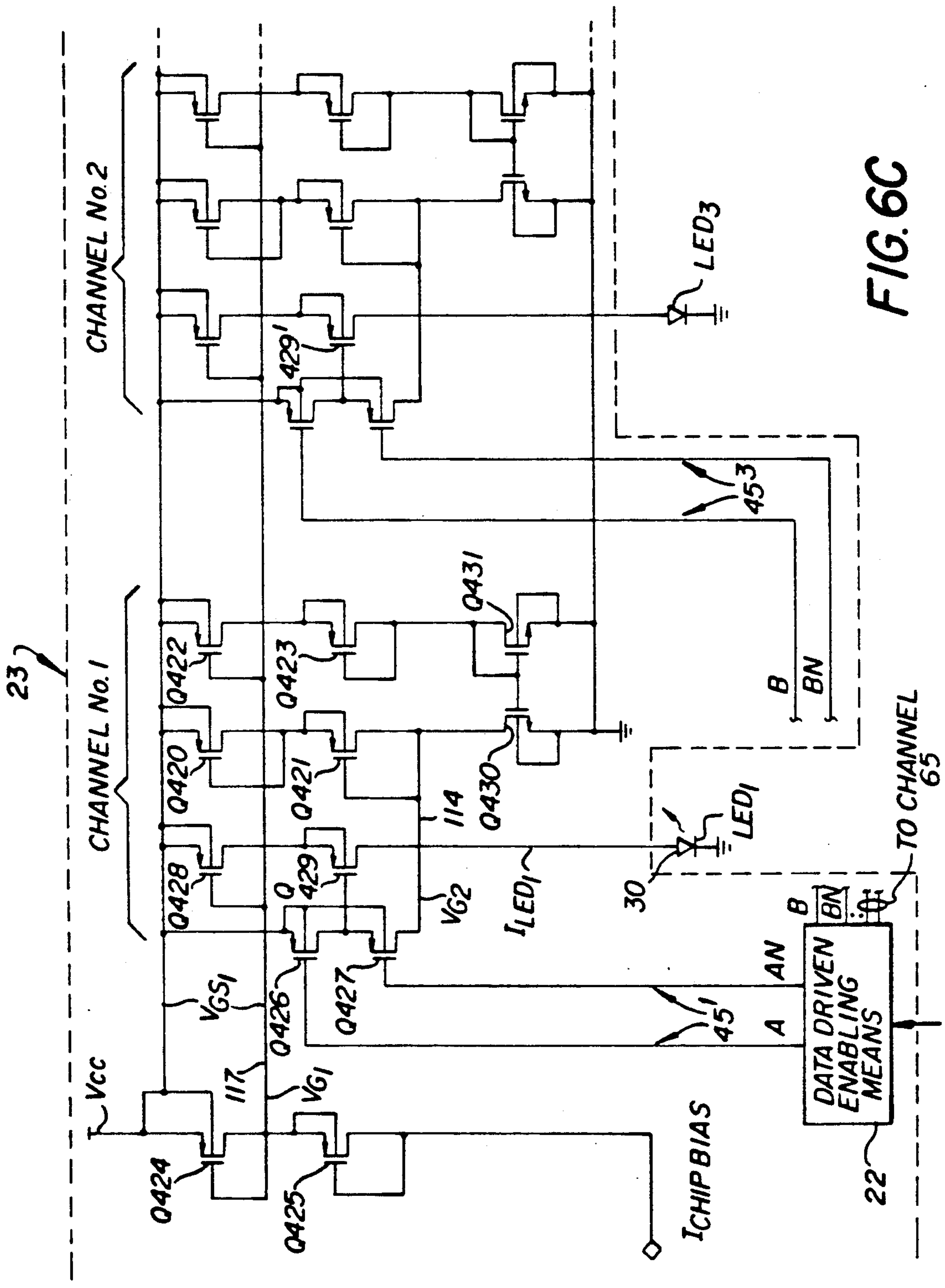

When transistor $Q_{429}$ is turned on, the current passing there through mirrors, i.e., is either the same or proportional to, the current passing through transistor $Q_{425}$. The current passing through transistor $Q_{425}$, in turn, is equal to I(CHIP BIAS). With reference now to FIGS. 6A and 6B, this current, I(CHIP BIAS) in turn is controlled by three factors comprising a temperature compensated current source 172, a first group of eight digitally controlled NMOSFET transistors $Q_{25}$, $Q_{26}$ . . . , $Q_{31}$, $Q_{32}$ and a second group of eight digitally controlled NMOSFET transistors $Q_5$, $Q_6$ . . . , $Q_{11}$, $Q_{12}$. Associated with the first group is a non-digitally controlled NMOSFET transistor $Q_{33}$. Similarly associated with the second group is non-digitally controlled NMOSFET transistor $Q_{13}$. As may be noted in FIGS. 6A and 6B, not all of the transistors are shown and the number of digitally controlled transistors provided in each group determines the level of control. Transistors $Q_{25}$, . . . , $Q_{32}$ are parallel connected transistors whose respective gate width to gate length ratios are scaled so that their respective currents are scaled or weighted in powers of two. For example, where eight digitally controlled transistors are provided for this first group ($Q_{25}$–$Q_{32}$), respective gate width to gate length ratios may be 256/5:128/5:64/5:32/5:16/5:8/5:4/5:2/5 and 321.5/5 for non-digitally controlled transistor $Q_{33}$.

Each digitally controlled transistor is controlled by a logic signal applied to a respective two-transistor switch circuit associated with the transistor. For example, the circuit defined by NMOSFET transistors $Q_{250}$ and $Q_{251}$ cause current to flow through transistor $Q_{25}$ when a high level logic signal is applied to the gate of transistor $Q_{250}$ and a complementary low logic signal is applied to the gate of transistor $Q_{251}$. The logic signals for controlling which of the current-carrying transistors are to be turned on are controlled by a register $R_2$ which stores an 8-bit digital word and its 8-bit complement representing a desired current control signal to turn on respective ones of the eight current conducting transistors $Q_{25}$, . . . $Q_{32}$. In conjunction with transistor $Q_{33}$, which is on continuously, this group of transistors is used for "localized" control of LED current. By this, it is meant that the digital word stored in register $R_2$ is specific for this driver chip and will be determined by adjustment of driver current to the LED's driven by this driver chip until the LED's each provide a desired light output level. This digital word may be input to the register R2 from memory in the LCU or from a separate memory such as a ROM provided on the printhead. This digital word may also be changed in response to the temperature of the driver chip as will be described below. Briefly, the level of current from an extra current mirror channel (#65) on each driver chip is used as a measure of temperature. A voltage generated by this current is digitized and compared by the LCU with a value based on the digital words in register R1 and R2. In response thereto, the LCU "writes" a new digital word into register R2, if a change in current level is required according to an algorithm stored in memory. At start-up, the LCU is programmed to provide or default to a particular set of digital words for placement into registers $R_1$ or $R_2$.

As noted in aforementioned U.S. Pat. No. 4,831,395, the contents of which are incorporated by this reference, the LCU may be programmed to maintain a count of prior activations of each LED and adjust a control voltage according to a program based on the aging characteristics of the printhead.

After this initial calibration and as the printhead ages through repeated use, both temperature and age factors operate to degrade light output. The affects due to aging will generally be similar to all LED's and are corrected for by adjustment of an 8-bit digital word and its 8-bit complement stored in register $R_1$.

This digital word controls 8 current-carrying NMOSFET transistors $Q_5$, . . . , $Q_{12}$. Associated with this group of transistors is a continuously conducting NMOSFET transistor $Q_{13}$. Exemplary gate width to length ratios for weighted digitally controlled transistors $Q_5$–$Q_{12}$ are 896/5:448/5:224/5:112/5:56/5:28/5:14/5:7/5 and 4027/5 for non-digitally controlled transistor $Q_{13}$. The 8-bit word and its 8-bit complement stored in register $R_1$ is the same as that stored in identical registers $R_1$ on the other driver chips. As the printhead ages, a new 8-bit digital word and its 8-bit complement is calculated by the LCU and input into the registers $R_1$. The calculation of this 8-bit word for aging may be based on empirical determinations made using similar printheads or based upon a calibration of this printhead using an optical sensor that senses the output from each or selected LED's or by sensing patches recorded on the photoconductor.

As noted above, a third factor for adjustment to maintain LED uniformity of light output from chip-to-chip is a temperature compensated current source 172. This current source includes a temperature sensor and circuitry which will assist in boosting current to the LED's in response to increases in temperature. Various circuits for accomplishing this are well known for example, see Gray and Meyer, Analysis and Design of Analog Integrated Circuits, 2nd edition, pages 733–735 and figure 12.28, the contents of which are incorporated by this reference. In this text description is provided of so-called $V_T$ (thermal voltage)-referenced current sources. By providing in such a circuit a resistor with an appropriate temperature coefficient, an output current, $I_o$, is provided that increases with an increase in temperature of the driver chip.

The operation of the circuit of FIGS. 6A, B and C and D will now be described. During use of the printhead the temperature of the driver chips will heat up differently in accordance with respective current carrying demands and abilities to dissipate heat caused by such demands through the heat-conducting structure to which the chips are mounted. The temperature compensated current $I_o$ is conducted to ground via NMOSFET transistor $Q_{33}$ and some, all or none of the transistors $Q_{32}$, $Q_{31}$, . . . and $Q_{25}$ depending upon the digital 8-bit signal and its 8-bit complement stored in register $R_2$. In accordance with which transistors in this group of transistors are enabled to conduct and recalling that these transistors are scaled or weighted differently in conducting capabilities the voltage level at the source terminal of $Q_{33}$ is determined. Note that switching transistors are associated with each of these digitally controlled transistors. For example, transistor $Q_{25}$ is controlled by switching transistors $Q_{250}$ and $Q_{251}$ in response to a signal causing $Q_{250}$ to conduct and $Q_{251}$ to turn off. The others are controlled similarly. This voltage level, $V_{TC}$, is also applied to the gate of transistor $Q_{13}$ and thereby controls the current conducted by transistor $Q_{13}$. As noted above, transistor $Q_{13}$ is the non-digitally controlled transistor associated with the digitally controlled transistor group $Q_5$, . . . , $Q_{11}$, $Q_{12}$. In accordance with the digital word stored in register $R_1$ selected ones of these transistors are caused to conduct thereby affecting the bias current level I (CHIP BIAS) through PMOSFET transistor $Q_{425}$. Recall that the transistors in this group of transistors also have scaled or weighted current-conducting capabilities. The current through PMOSFET transistor $Q_{425}$ is equal to the current conducted by the master circuit comprised of transistor $Q_{424}$, which current is replicated or scaled by current mirrors of PMOSFET slave transistors $Q_{429}$, $Q_{429'}$, . . . etc., i.e., the current controlling transistors to $LED_1$, $LED_3$ --- $LED_{127}$, respectively, as well as the extra temperature sensing circuit using channel 65. Transistor $Q_{429}$ is caused to conduct when its respective logic transistors $Q_{426}$, $Q_{427}$ are appropriately signaled by data signals indicating a pixel to be printed. Thus, when a logic low signal is applied to line 45[1] (AN) transistor $Q_{427}$ turns on and biases the gate of transistor $Q_{429}$ to the level $V_{G2}$. Since transistors $Q_{424}$ and $Q_{428}$ have identical biasing, the current through transistor $Q_{429}$ will mirror or be scaled to that of transistor $Q_{424}$ for the time period for exposing a pixel as controlled by the duration of the logic low signal on line 45[1] (AN). As is noted in FIG. 6C, the current through $Q_{429}$ is fed to $LED_1$, for the recording of a pixel. Identical current levels will be developed in the other channels directly providing current to respective other LED's. Thus, all LED's driven by this driver chip receive the same current for periods determined by their respective enablement signals and the currents thereto are appropriately adjusted to maintain constant the intensity of the LED's.

Figure 5A:
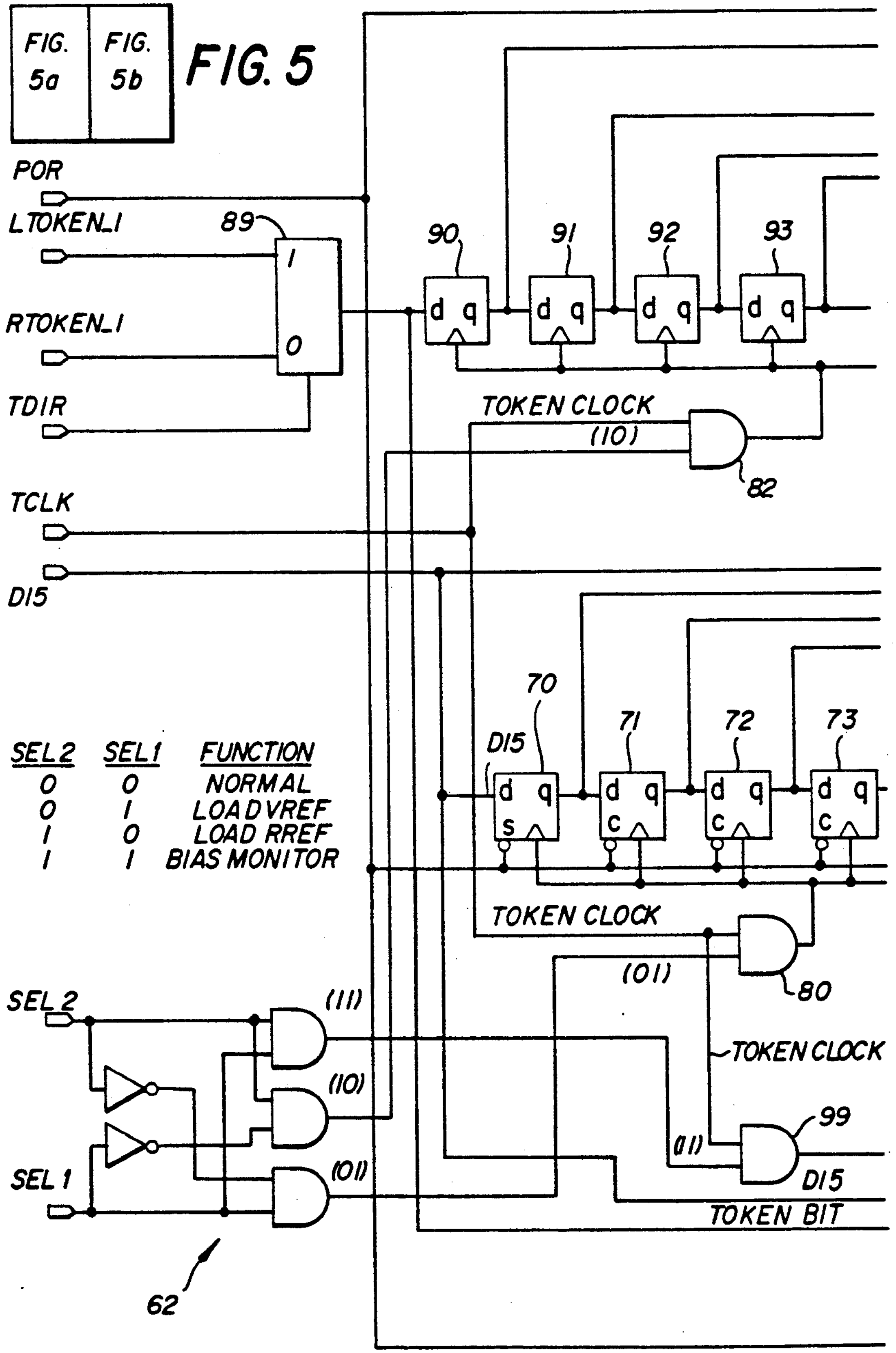
Figure 5B:
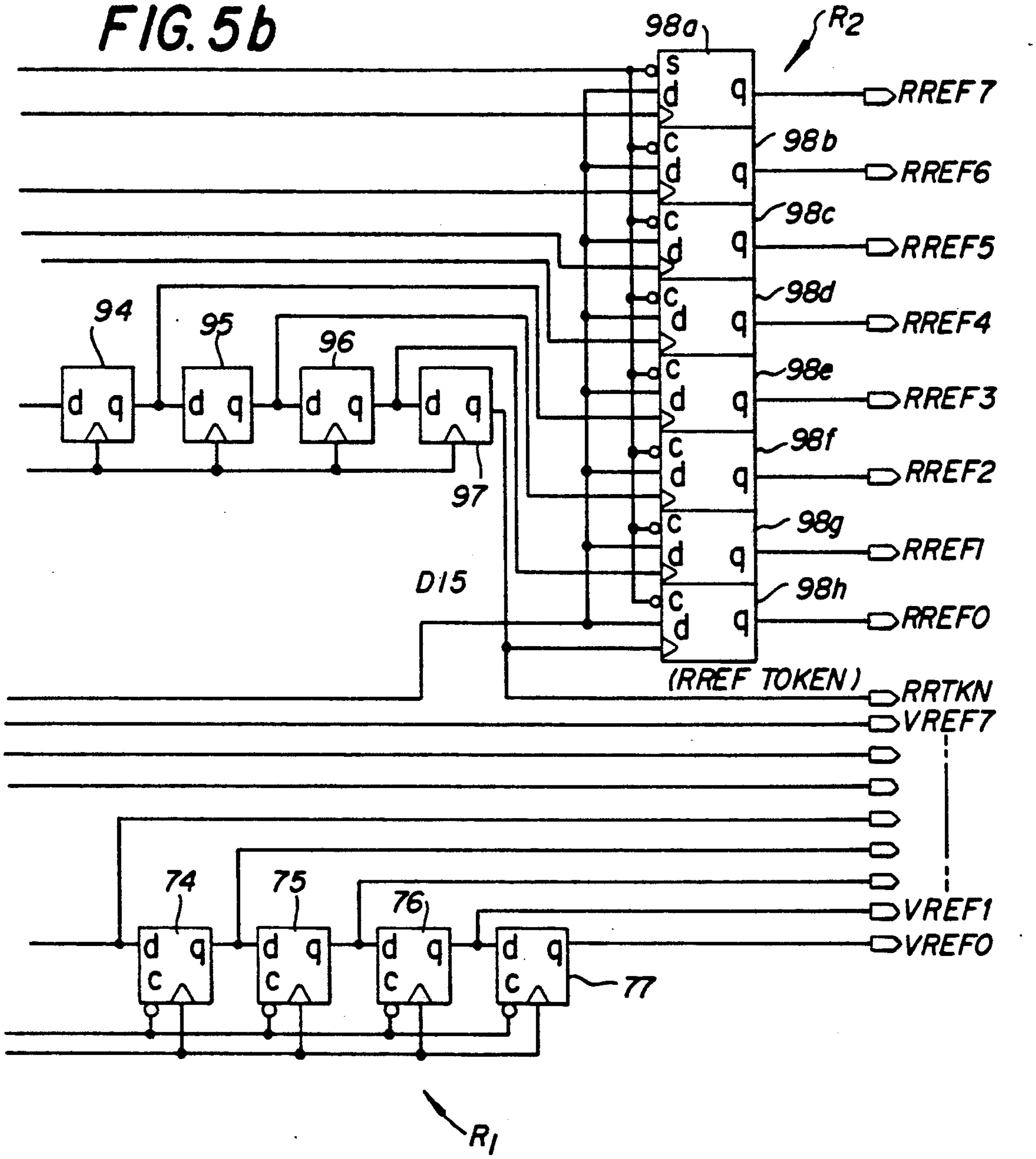
Figure 5B:
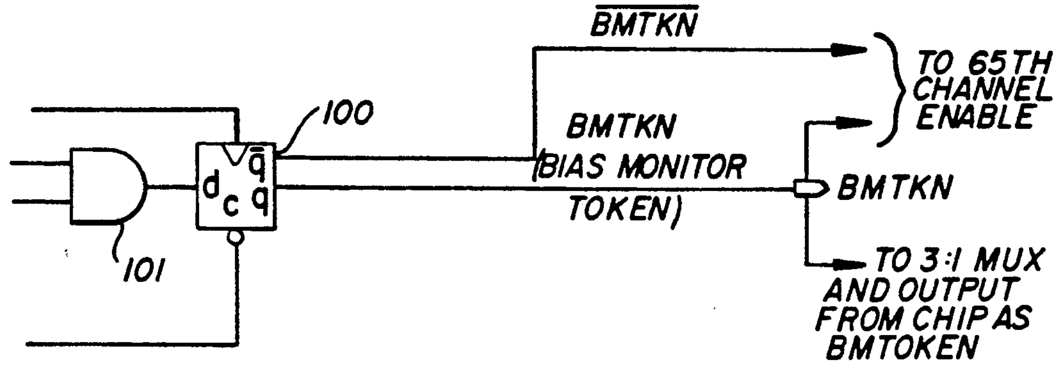

With reference now to FIGS. 4 and 5, description will now be provided of circuitry using the token bit and image data lines for purposes of regulating current to the LED's. As noted above, current to the LED's is controlled using digital words stored in registers $R_1$ and $R_2$. In order to minimize the number of lines going to the printhead and the number of connections of wires required to be bonded in fabricating a printhead having a multitude of driver chips, the token line used for latching image data as described above will also be used for latching current data to the various driver chips.

In FIGS. 4 and 5, lines SEL 1 and SEL 2 establish a two-bit selection of four possible operating modes of the token system. As noted in the chart accompanying FIG. 5, the options for these modes include a normal mode; i.e., one where the token is used for controlling image data to the appropriate registers 24 for latching image data, a load $V_{REF}$ mode wherein the digital current regulation word for loading register $R_1$, the global bias, is established; a load $R_{REF}$ mode wherein the digital current regulation word for loading register $R_2$, the local bias, is established. The fourth mode is referred to as a bias monitor mode and is used to check on the level of current sent to the LED's by sequentially operating channel 65 of each driver chip.

The use of the token bit for image data has been described above is made when the "00" two-bit signal is established by the LCU at the inputs (SEL 2, SEL 1) of the 3:1 multiplexirs 60 and the logic set 62 which forms a part of the circuitry of FIG. 5 referred to as the "serial interface for $V_{REF}/R_{REF}$ loading and bias monitoring." As noted in FIG. 5, the logic set may be in the form of interconnected logic AND gates. With a "00" signal, this serial interface is disabled. Data over lines DI0–DI5 is then appropriately latched by the master data flip-flops 25 in registers 24 as described above during shifting of the token bit over the token line LTOKEN and token registers 29. Data is then transferred in accordance with the techniques described above to control the duration of on-time for recording respective pixels.

After a period of use of the LED printhead there may arise, due to aging of the printhead, a need to adjust the current to all the LED's. Thus, a global bias adjustment is called for by the LCU in response to a determination by the LCU that the criterion for the need for such adjustment is met. Such a criterion may be a count of printing activations or time. In response, the LCU provides a signal "01" to lines SEL 2, SEL 1 during a non-production interval, as well as calculates, in accordance with an updating formula based on empirical data determined from aging this or similar printheads, an updated 8-bit word to be transmitted to all the driver chips. This updated current regulating data is transmitted serially over a single line DI5 of the image data bus (DI0–DI5) to the data input of a series of cascaded flip-flop registers 70–77, which form the register $R_1$ for storing signals $V_{REF(0-7)}$. The data over DI5 is shifted through these registers 70–77 in response to the token clock (TCLK) operating through and AND gate 80. Since DI5 is a line forming a part of the data bus the signal on line DI5 is available to all the driver chips and is latched simultaneously by the other driver chips. Thus, the $R_1$ registers of all driver chips are loaded simultaneously with the current control data signals $V_{REF(0-7)}$ in the above manner.

In order to load the "localized" current regulation signals $R_{REF(0-7)}$ into registers $R_2$, the LCU provides a "10" signal to SEL 2 and SEL 1. This enables latches to be responsive to the token clock through AND gate 82. The token bit carried on line LTOKEN is input via direction control gate 87 to latch register 90 and is then shifted through associated latches 91–97 in response to the token clock signal TCLK. The respective outputs of latches 90–97 are input to the clock inputs of registers $R_2$ storing the $R_{REF(0-7)}$ signals. As the token bit shifts through latches 90–97, the data on line DI5 is latched by the token bit in latches 90–97, into the respective flip-flops **98*a–h* that comprise registers $R_2$. At anyone time only one of the registers forming $R_2$ is enabled by the token bit and that register gets to latch the data currently on DI5. Note that DI5 is commonly connected to the data inputs of all the registers forming $R_2$. After being shifted down the latches 90–97**, in response to the token clock the token bit is shifted out of this driver chip and into an adjacent driver chip for latching DI5 into the $R_2$ register flip-flops for the current drivers in the next driver chip and so on. Thus, the current control data from the LCU for registers $R_2$ is specific or local to each driver chip even though this data is carried on a data line of an image data bus that is commonly connected to all the $R_2$ registers of the driver chips located on one side of the row of LED's.

Description will now be provided of the fourth mode of operation which is called "bias monitor." In this mode, currenty from an extra or 65th current driver channel on each driver chip is monitored by the LCU. In this mode, monitoring is done to determine whether or not an acceptable current level is being provided by the current drivers and therefore whether or not the power to the printhead should be effectively shut down or adjusted to avoid damage or to better control output of the LED's. Additionally or alternatively, the monitoring of current serves to provide an indication of LED temperature and is useful to provide for a determination of when data should be modified to correct for loss of intensity of light output by the LED's as they heat up during use. Although the use of $V_{RDF}$ and $R_{REF}$ adjustments are used to control the level of current to the LED's driven by a particular driver chip, finer control can also be provided by control also of the pulsewidth duration of the LED's through correction of image data.

One example of a problem situation that is monitorable is where a cooling fan for the printhead fails and the temperature of the printhead rises during printing. The current level detected serves as a measure of temperature and when compared with the digital words stored in registers $R_1$ and $R_2$ indicates that a problem exists; i.e., the current level being generated is not within an expected range based on the control signals stored in registers $R_1$ and $R_2$.

Figure 6D:
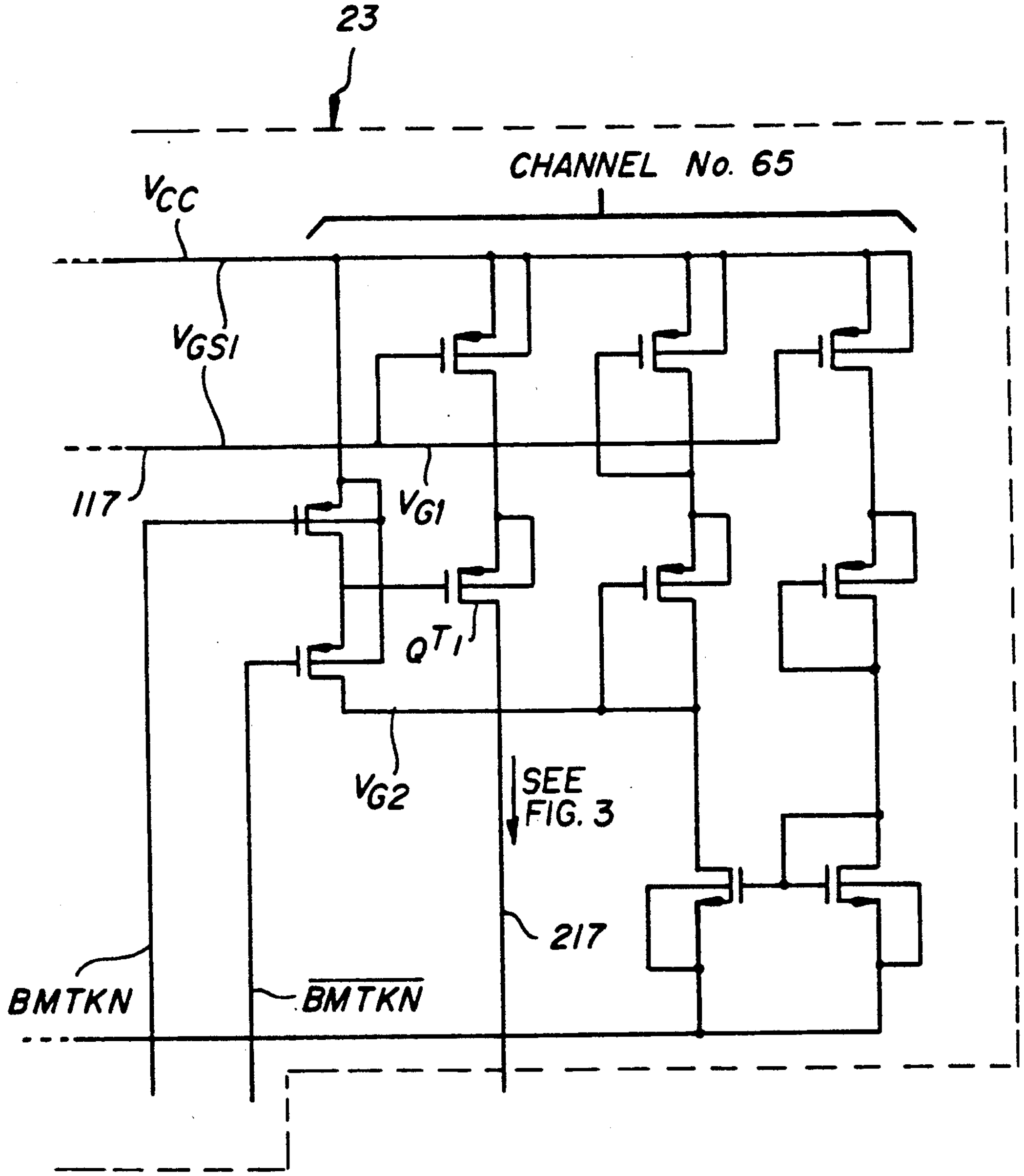

In the bias monitor mode, the LCU provides a signal "11" to lines, SEL1 and SEL2. This causes the token clock to be clocked through AND gate 99 to enable a bias monitor register 100 which receives at its "D" input an output from a logic AND gate 101 which has as its inputs the token bit and a single bit "data" signal on data line DI5, representing whether or not the LCU is calling for monitoring of the current on this driver chip. Recall that line DI5 is available to all driver chips (of the odd-numbered driver chips) but it is the token bit that is shifted from driver chip to driver chip that determines which driver chip is to latch this data into its respective register. Assuming that the token bit has latched a logic high level into this register 100, the outputs (regular and inverse) of the register 100 are switched and enables transistor $Q^{T1}$ (FIG. 6D) which controls current through a calibrated fixed resistor R, 88, (FIG. 3) that is commonly connected to the respective transistors $Q^{T1}$, $Q^{T3}$, $Q^{T55}$ of all driver chips located on one side of the row of LED's. The voltage level across the resistor 88 is related to the current on line 217 provided by transistor $Q^{T1}$, and this voltage level is sensed and converted by an analog to digital converter 89. A digital representation of this voltage signal is fed back to the LCU. The LCU, in accordance with a program stored therein, determines if the current is acceptable in that chip and if power to the printhead should be shut down to the whole printhead by a suitable switch to the power supply supplying the printhead such as removing voltages $V_{cc}$ and $V_{DD}$ to the current source 172 via switch S (FIG. 6A). Note that because of the similar circuitry in channel 65 to that for the other driver channels on that chip, the current in channel 65 is similar to that of such other channels and thus is a measure of current that will flow to each LED for which the corresponding driver channel is enabled. The entering of the bias monitor mode is advantageously done after $V_{REF}$ and/or $R_{REF}$ changes have been made to allow the LCU to determine that a safe and/or appropriate level of current to the LED's will be provided. Thus, the LCU is programmed to enter this calibration mode after such changes and on any power-up operation.

Alternatively, the LCU may be programmed to provide current regulation data to the printhead to lower the current level until a safe and/or otherwise appropriate level of current is detected. If a safe level is not detected, then a shutdown signal may be generated to remove power to the printhead. The LCU in this mode may count the token clock pulses and is thus able to determine which of the driver chips has the unsafe level of current. Since the voltage related signal sensed by the A/D converter is also related to the temperature of the printhead such signal may also be used by the LCU to adjust current to the LED's by changing the 8-bit (and 8-bit complements) local current regulating signals $R_{REF}$ stored in registers $R_2$ in response to an algorithm relating temperature measured and signals to be fed to a respective driver chip's registers $R_2$. The signal relative to temperature may also be used to adjust the data signals to regulate the on-time of the LED's.

Note that the 65th channels on the even driver chips are also commonly connected to the input of the A/D converter 89 (FIG. 3). A reading of the voltage generated by a respective 65th driver channel on an even-numbered driver chip is determined by having a logic high level on the DI5 line on the even side with a corresponding low level signal on the DI5 line on the odd side since logic AND gate 101 (FIG. 5) on each driver chip passes the token bit only when the respective (odd or even) DI5 line is logic high. If desired, additional control circuitry may be associated with A/D converter 89 to add flexibility to the A/D converter.

ADVANTAGES

A printhead for recording has been described which provides efficient use of the electrical lines provided thereon. Multibit image data is effectively latched into appropriate registers in accordance with a token bit. Current regulation is effectively controlled using digitally addressed current regulation. Data for the image signals and current regulations are carried over the same lines, thereby reducing the need for additional lines. This reduces the number of bonding pads and connections required to be made in fabricating the printhead.

While the preferred embodiment has been described in terms of MOSFET transistors that have their respective gates controlled, other devices providing an equivalent function such as bipolar or other gate controlled devices are also contemplated. Where bipolar transistors are used, transistor-geometry or doping levels to respective transistors may be modified to provide the current scaling characteristics described herein.

While an embodiment of the invention has been described employing a single data line DI5 (for say the odd-numbered driver chips) for carrying current regulating signals, it will be appreciated that multiple lines of the image data bus may be used for carrying current regulation data in parallel.

The invention has been described in detail with particular reference to preferred embodiments thereof, but it will be understood that variations and modifications can be effected within the spirit and scope of the invention.

What is claimed is:

1. A non-impact printer apparatus comprising:

a recording head having a plurality of recording elements for recording on a recording medium;

driving means for selectively driving said plurality of recording elements in accordance with respective image data signals;

data bus means for carrying multibit image data signals and for carrying on one line that is also used for carrying image data signals, a multibit digital signal used for regulating current;

said driving means including a plurality of data register means with respective data register means being associated with each recording element for storing said image data signals;

means for commonly connecting said data bus means to said plurality of data register means;

means for generating a token bit signal;

a multistage shift register means for outputting sequentially at respective stages the token bit signal for sequentially selecting a respective data register means for accepting image data signals;

said driving means further including current regulating means for regulating a level of electrical current to each recording element, the current regulating means including means for adjusting a level of electrical current to each recording element in response to the multibit digital signal used for regulating current, and wherein the current regulating means further includes first register means including a plurality of registers for storing a multibit digital signal related to a level of current control, second register means for storing and shifting a token bit signal and means responsive to a token bit signal in said second register means for latching in an appropriate register of said first register means a digital signal found on said data bus means.

2. The printer apparatus of claim 1 and wherein the driving means is incorporated within an integrated circuit driver chip, and wherein at least two of such driver chips are provided on the printer apparatus and further wherein a token bit line couples said at least two driver chips to each other so that respective token bit signals latch, in appropriate registers of said driver chips, digital signals related to current control.

3. The apparatus of claim 1 and wherein said data bus means includes a plurality of independent data lines, each carrying image data signals.

4. The apparatus of claim 3 and wherein said driving means includes means responsive to signals in said respective data register means for driving a respective recording element for a time period related to said signals in said respective data register means.

5. The apparatus of claim 4 and wherein the recording elements are light-emitting diodes.

6. A non-impact printer apparatus comprising:

a recording head having a plurality of recording elements for recording on a recording medium;

driving means for selectively driving said plurality of recording elements in accordance with respective image data signals, said driving means including a plurality of data register means with respective data register means associated with each recording element for storing said image data signals;

data bus means for carrying image data signals;

means for commonly connecting said data bus means to said plurality of data register means;

means for generating a token but signal;

a multistage shift register means for outputting sequentially at respective stages the token bit signal for sequentially selecting a respective data register means for accepting image data signals;

said driving means further including current regulating means for regulating a level of electrical current to each recording element, the current regulating means including means for adjusting a level of electrical current to each recording element in response to a multibit digital signal; and wherein the current regulating means further includes first register means including a plurality of registers for storing digital signals related to a level of current control, second register means for storing and shifting a token bit signal, and means responsive to a token bit signal in said second register means for latching in an appropriate register of said first register means a bit of the multibit digital signal.

7. The apparatus of claim 6 and wherein said data bus means comprises a plurality of independent data lines each carrying image data signals and said multibit digital signal for current regulation is carried on at least one of said data lines.

8. The apparatus of claim 6 or 7 and wherein said driving means includes means responsive to the signals in said respective data register means for driving a respective recording element for a time period related to said signals in said respective data register means.

9. The apparatus of claim 8 and wherein the recording elements are light-emitting diodes.

10. A non-impact printer apparatus comprising:

a recording head having a plurality of recording elements for recording on a recording medium;

driving means for selectively driving said plurality of recording elements in accordance with respective image data signals;

image data bus means for carrying image data signals related to an exposure duration;

said driving means including respective data register means associated with each other recording element for storing said image data signals;

means for connecting said data bus means to said data register means;

said driving means further including current regulating means for regulating a level of electrical current to each recording element the current regulating means including means for regulating a level of electrical current to each recording element in response to a multibit digital signal; and means for generating, on the image data bus means, the multibit digital signal used for regulating current; and wherein the current regulating means further includes first register means including a plurality of registers for storing a multibit digital signal related to a level of current control, second register means for storing and conveying a token bit signal and means responsive to the token bit signal for latching in an appropriate register of said first register means a digital signal found on said data bus means.

11. The apparatus of claim 10 and wherein said data bus means comprises a plurality of independent data lines, each carrying image data signals.

12. The apparatus of cliam 11 and wherein said driving means includes means responsive to the signals in said respective data register means for driving a respective recording element for a time period related to said signals in said respective data register means.

13. The apparatus of claim 12 and wherein the recording elements are light-emitting diodes.

14. A driver chip for use on a non-impact printer apparatus having a plurality of recording elements for recording, the driver chip comprising:

driving means for selectively driving said plurality of recording elements in accordance with respective image data signals;

image data carrying means including a plurality of lines for carrying image data signals and at least one line thereof carrying a multibit signal used for regulating current;

a plurality of data register means with a respective data register means connectable with a respective recording element for storing said image data signals;

a multistage shift register means for outputting sequentially at respective stages a token bit signal for sequentially selecting a respective data register means for accepting image data signals on said image data carrying means;

said driving means further including current regulating means for regulating a level of electrical current to each recording element, the current regulating means including means for adjusting a level of electrical current to each recording element in response to a multibit digital signal;

means for coupling at least one line of said plurality of lines with said current regulating means for conveying the multibit digital signal used for regulating current to said current regulating means; and wherein the current regulating means includes first register means including a plurality of registers for storing a multibit digital signal related to a level of current control, second register means for storing and shifting a token bit signal and means responsive to a token bit signal in said second register means for latching in an appropriate register of said first register means a digital signal found on said at least one of the plurality of lines.

15. The driver chip of claim 14 and wherein said driving means includes means responsive to the signals in said respective data register means for driving a respective recording element for a time period related to said signals in said respective data register means.

16. A driver chip for use on a non-impact printer apparatus, the driver chip comprising:

driving means for selectively driving said plurality of recording elements in accordance with respective image data signals;

respective data register means connectable with a respective recording element for storing said image data signals;

image bus means including a plurality of lines for carrying image data signals;

means for connecting said plurality of lines to said data register means;

a multistage shift register means for outputting sequentially at respective stages a token bit signal for sequentially selecting a respective data register means for accepting image data signals;

said driving means further including current regulating means for regulating a level of electrical current to each other recording element, the current regulating means including means for adjusting a level of electrical current to each recording element in response to a multibit digital signal; and wherein the current regulating means includes first register means including a plurality of registers for storing digital signals related to a level of current control, second register means for storing and shifting a token bit signal, and means responsive to a token bit signal in said second register means for latching in an appropriate register of said first register means a bit of the multibit digital signal.

17. The driver chip of claim 16 and wherein said image data bus means carries on at least one of said lines a multibit digital signal used for current regulation.

18. The driver chip of claim 16 and 17 and wherein said driving means includes means responsive to the signals in said respective data register means for driving a respective recording element for a time period related to said signals in said respective data register means.

19. A driver chip for use on a non-impact printer apparatus having a plurality of recording elements for recording, the driver chip comprising:

driving means for selectively driving said plurality of recording elements in accordance with respective image data signals;

means including a plurality of lines for carrying image data signals related to an exposure duration and for carrying on at least one of said lines a multibit digital signal used for regulating a level of current to each recording element;

respective data register means connectable with a respective recording element for storing said image data signals;

means for connecting said plurality of lines to said data register means;

said driving means further inluding current regulating means for regulating a level of electrical current to cach recording element, the current regulating means including means for adjusting the level of current in responsive to a multibit digital signal; and wherein the current regulating means includes first register means including a plurality registers for storing a multibit digital signal related to a level of current control, second register means for storing and conveying a token bit signal, and means responsive to the token bit signal for latching in an appropriate register of said first register means a digital signal found on said at least one of said plurality of lines.

20. The driver chip of claim 19 and wherein said driving means includes means responsive to the signals in said respective data register means for driving a respective recording element for a time period related to said signals in said respective data register means.

* * * * *